US012488909B2

(12) United States Patent
Kumar et al.

(10) Patent No.: US 12,488,909 B2
(45) Date of Patent: Dec. 2, 2025

(54) OXYGEN AND MOISTURE BARRIER COMPOSITIONS AND RELATED METHODS

(71) Applicant: University of Massachusetts, Boston, MA (US)

(72) Inventors: Jayant Kumar, Boston, MA (US); Ramaswamy Nagarajan, Boston, MA (US); Siddhant Iyer, Boston, MA (US); Ravi Mosurkal, Boston, MA (US); Lian Li, Boston, MA (US); Claire Lepont, Boston, MA (US)

(73) Assignee: University of Massachusetts, Boston, MA (US)

( * ) Notice: Subject to any disclaimer, the term of this patent is extended or adjusted under 35 U.S.C. 154(b) by 54 days.

(21) Appl. No.: 18/398,599

(22) Filed: Dec. 28, 2023

(65) Prior Publication Data
US 2024/0242854 A1  Jul. 18, 2024

Related U.S. Application Data

(60) Provisional application No. 63/435,870, filed on Dec. 29, 2022.

(51) Int. Cl.
*H01B 1/20* (2006.01)
*C08K 9/08* (2006.01)

(52) U.S. Cl.
CPC ................... *H01B 1/20* (2013.01); *C08K 9/08* (2013.01)

(58) Field of Classification Search
CPC . H01B 1/20; H01B 1/122; C08K 9/08; C08K 3/346; C08K 9/04
See application file for complete search history.

(56) References Cited

U.S. PATENT DOCUMENTS

| | | | | |
|---|---|---|---|---|
| 6,261,640 B1* | 7/2001 | Pinnavaia | ................ | B01J 20/10 |
| | | | | 427/384 |
| 6,271,298 B1* | 8/2001 | Powell | ..................... | C08K 9/04 |
| | | | | 523/333 |
| 6,287,634 B1* | 9/2001 | Beall | ....................... | C01B 33/44 |
| | | | | 501/141 |
| 9,695,334 B2 | 7/2017 | Golden et al. | | |
| 2003/0100657 A1* | 5/2003 | Twardowska | ............ | C08K 9/04 |
| | | | | 524/445 |
| 2006/0160940 A1* | 7/2006 | Muhlebach | .......... | C09D 153/00 |
| | | | | 524/445 |
| 2007/0049680 A1* | 3/2007 | Maruo | .................... | B32B 27/08 |
| | | | | 524/445 |
| 2007/0106005 A1* | 5/2007 | Bourgeois | ............... | B32B 19/02 |
| | | | | 524/445 |
| 2007/0191527 A1* | 8/2007 | Mallikarjuna | ......... | C08K 3/346 |
| | | | | 524/445 |

(Continued)

OTHER PUBLICATIONS

"Reliable thin film encapsulation for organic emitting diodes by low-temperature atomic layer deposition", Applied Physical Letters, 2009; 5 pages.

(Continued)

*Primary Examiner* — Mark Kopec
*Assistant Examiner* — Jaison P Thomas
(74) *Attorney, Agent, or Firm* — Stites & Harbison, PLLC

(57) ABSTRACT

Disclosed herein is a curable composition with high optical transparency and good oxygen and moisture barrier properties, compositions for making the same, and methods of making and of using the same.

19 Claims, 2 Drawing Sheets

(56) References Cited

U.S. PATENT DOCUMENTS

| | | | |
|---|---|---|---|
| 2014/0275347 A1* | 9/2014 | Nawani | C08K 9/08 |
| | | | 524/789 |
| 2014/0343224 A1* | 11/2014 | Su | C08G 18/6662 |
| | | | 524/714 |

OTHER PUBLICATIONS

Bertho et al., "Effect of temperature on the morphological and photovoltaic stability of bulk heterojunction polymer: fullerene solar cells", Solar Energy Materials and Solar Cells, vol. 92, 2008; pp. 753-760.

De Bettignies et al., "Accelerated lifetime measurements of P3HT:PCBM solar cells", Synthetic Metals, vol. 156, 2006; pp. 510-513.

Elrawemi et al., "Modelling water vapour permeability through atomic layer deposition coated photovoltaic barrier defects", Thin Solid Films, vol. 570, 2014; pp. 101-106.

Fahlteich et al., "Ultra-High Barriers for Encapsulation of Flexible Displays and Lighting Devices", SID 2013 Digest, 4 pages.

Ghosh et al., "Thin-film encapsulation of organic light-emitting devices", Applied Physics Letters, vol. 86, 2005; 4 pages.

Ghosh et al., "Thin-film encapsulation of organic light-emitting devices", Applied Physics Letters, vol. 86, 223503, 2005; 4 pages.

Giannouli et al., "Methods for Improving the Lifetime Performance ofOrganic Photovoltaics with Low-Costing Encapsulation", Chem Phys. Chem.; 22 pages.

Kaalberg et al., "Enhancing Cationic Ring-Opening Photopolymerization of Cycloaliphatic Epoxides via Dark Cure and Oxetanes", Journal of Polymer Science, Part A: Polymer Chemistry, vol. 56, 2018; pp. 1436-1445.

Kawano et al., "Degradation of organic solar cells due to air exposure", Solar Energy Materials & Solar Cells, vol. 90, 2006; pp. 3520-3530.

Morgado et al., "Environmental aging of polyžp-phenylenevinylene/ based light-emitting diodes", Synthetic Metals, vol. 114, 2000; pp. 189-196.

Park et al., "The film encapsulation for flexible AM-OLED: a review", Semiconductor Science and Technology, vol. 26, 2011; 9 pages.

Perrin et al., "The physics of plasma-enhanced chemical vapour deposition for large-area coating: industrial application to flat panel displays and solar cells", Plasma Physics and Controlled Fusion, vol. 42, 2000; 12 pages.

Sutherland et al., "Photo-oxidation of electroluminescent polymers studied by core-level photoabsorption spectroscopy", Appl. Phys. Lett., vol. 68, No. 15, 1996; 3 pages.

Wuu et al., "Plasma-deposited silicon oxide barrier films on polyethersulfone substrates: temperature and thickness effects", Surface & Coatings Technology, vol. 197, 2005; pp. 253-259.

Yang et al., "Photocurable Transparent Cycloaliphatic Epoxy HybridMaterials Crosslinked by Oxetane", Journal of Applied Polymer Science, vol. 000, 000-000, 2012; 7 pages.

Zhou et al., "Conjugated ionic polyacetylenes: 8. Amphiphilic poly(N-octadecyl-2-ethynylpyridinium bromide)", Polymer, vol. 37, No. 8; pp. 1477-1485.

* cited by examiner

OXYGEN AND MOISTURE BARRIER COMPOSITIONS AND RELATED METHODS

CROSS REFERENCE TO RELATED APPLICATION

This application claims priority to U.S. Provisional Application No. 63/435,870, filed Dec. 29, 2022, the contents of which is hereby incorporated by reference in its entirety.

STATEMENT REGARDING FEDERALLY SPONSORED RESEARCH & DEVELOPMENT

This invention was made with government support under W911QY-18-2-0006 awarded by the Department of Defense. The government has certain rights in the invention.

BACKGROUND

A significant problem associated with some electronic systems stems from their rapid deterioration in functionality and performance when exposed to environmental stimuli such as light, oxygen, moisture and other reactive species. Oxygen and moisture mediated degradation of the active and interfacial layers and components in these systems compromises their longevity and reduces their reliability over time. Taking the example of organic photovoltaic (OPV) devices, degradation in performance is associated with their poor resistance to water, oxygen, high temperatures, light exposure and other environmental factors. The conjugated polymer(s) and other molecular species that comprise the semiconducting active layer in the OPV devices are unstable in air and undergo photolytic and photochemical reactions if exposed to sunlight, some of which cause photodegradation of the polymers by oxidation of the vinyl bonds in the conjugated species resulting in formation of carbonyl groups. This in turn induces morphological changes within the active layer blend yielding decreased absorbance within the conjugated system. The ingress of moisture through the pinholes or cavities within the interfacial/active layers accelerates degradation and facilitates charge recombination. Moreover, the oxidation of active layer molecules results in the formation of electron traps which decreases carrier mobility and reduces the short-circuit current density of the device.

Preventing the ingress of oxygen and moisture is important in ensuring the long-term stability of optoelectronic, optoelectrofluidic, and energy-storage systems. Attempts at achieving at least some barrier protection have included providing multi-layered stacks of polymeric films with sputtered metal oxide layers with polymeric relief layers in the form of alternating dyad structures. These structures can enhance the barrier properties by creating a tortuous path for moisture and oxygen to traverse through the combination of multiple layers thereby reducing the probability of the molecules traversing through to the other side. Unfortunately, the implementation of these materials in electronic devices is hindered by the possibility of inter-layer delamination (due to fatigue or crack propagation), compromising the barrier protection offered by the original composition. This delamination will be more pronounced in electronic devices with fiber-based form factors that undergo repeated flexing during their life-cycles. Additionally, the processes employed to deposit thin films of inorganic barrier materials include atomic layer deposition (ALD), plasma-enhanced chemical vapor deposition (PECVD) or low-pressure chemical vapor deposition (LPCVD) are energy-intensive, time-consuming, and require vacuum and expensive infrastructure. In addition, the vacuum based coating systems cannot be implemented in fiber-based electronic devices that comprise a series of fragile and temperature-sensitive layers, rendering them incompatible with the process and susceptible to damage.

New barrier materials that can improve the barrier properties to water or oxygen are therefore desired. It would further be preferable if the material could be flexible whilst still maintaining its optical transparency, with minimal degradation in its oxygen and moisture barrier properties.

BRIEF SUMMARY

Disclosed herein is a curable composition with high optical transparency and good oxygen and moisture barrier properties, compositions for making the same, and methods of making and of using the same.

An aspect is a composition comprising: a plurality of ionic layered filler particles; wherein each of the plurality of ionic layered filler particles has an aspect ratio of at least 1:100; wherein the plurality of ionic layered filler particles is coated with an intercalating compound on a surface of the plurality of the ionic layered filler particles; wherein the intercalating compound has a size sufficient to change the basal spacing of the ionic layered filler particles relative to the basal spacing of the ionic layered filler particles in the absence of the intercalating compound, wherein the intercalating compound comprises a polyelectrolyte or a charged small molecule.

Another aspect is a composite comprising: the composition and a matrix; wherein the composition is embedded in the matrix.

Another aspect is a curable composition comprising: the composition; a crosslinkable monomer comprising a resin selected from the group consisting of acrylate, epoxy, urethane, silicone, oxetane or combinations thereof; a photoinitiator; a photosensitizer; and a catalytically active accelerator comprising a Lewis acid.

The above described and other features are exemplified by the following figures, detailed description, and claims.

BRIEF DESCRIPTION OF THE DRAWINGS

The following Figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
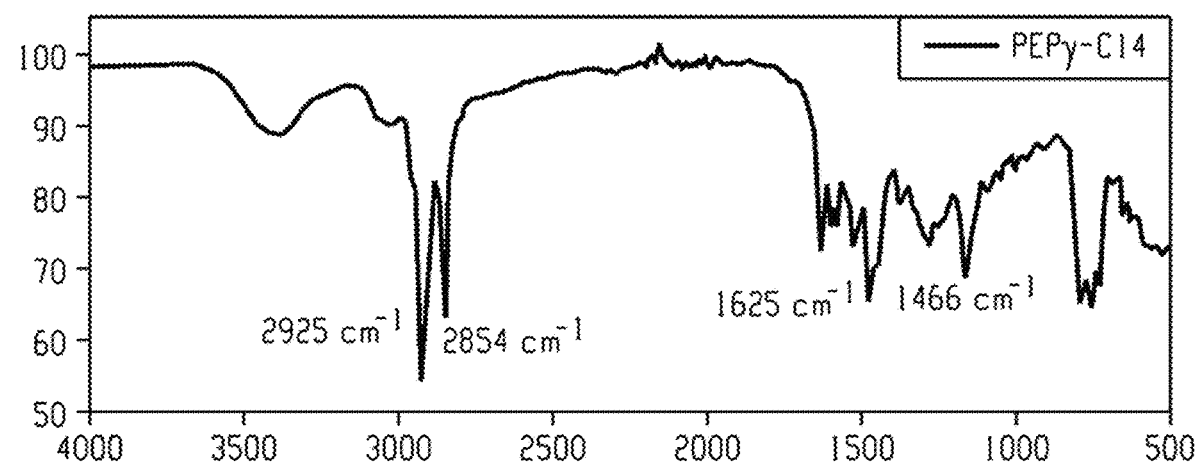
FIG. 1 is a graphical illustration of the ATR-FTIR spectrum of Example 1.

This disclosure relates to compositions with high oxygen and moisture barrier properties for encapsulation of solid-state electronic systems/devices including but not limited to thin-film systems and fiber-based systems. The composition can be used to form flexible materials that have good transparency. A novel composition was developed that can improve the barrier properties when incorporated into electronic materials. The composition comprises a plurality of surface modified, high aspect ratio nanoparticles, wherein the surface modification (also referred to herein as a coating) includes a polyelectrolyte or charged small molecule for example, but not limited to, an alkylated or arylated polypyridine. The coated nanoparticles can be included in composites to form materials with improved barrier properties. A significant improvement is therefore provided by the present disclosure.

Accordingly, an aspect of the present disclosure is a composition. The composition comprises a plurality of ionic layered filler particles. The ionic layered filler particles can be cationic or anionic. For example, the ionic layered filler particles can have a negative charge on the surface and between the individual layers that comprise the filler particles, or the ionic layered filler particles can have a positive charge on the surface and between the individual layers that comprise the filler particles. In an aspect, the ionic layered filler particles comprise at least two layers. An average lateral dimension of the filler particles can be between 10-200 micrometers (µm) as determined in accordance with scanning electron microscopy (SEM) imaging. The filler particles can comprise a plurality of platelets. Each platelet can have an average thickness of at least 1.5 nanometers (nm). Each of the plurality of the filler particles can have an aspect ratio of at least 1:100 (length:thickness).

In an aspect, the plurality of particles can comprise a plurality of silicate particles. The plurality of silicate particles can comprise at least one of a layered phyllosilicate or a layered aluminosilicate with the proviso that the particles have a negative charge on the surface and between the individual layers that comprise the phyllosilicate, wherein the layered phyllosilicate and/or aluminosilicate comprises of at least two layers. A phyllosilicate may comprise at least 79% Si with x % Al, y % Ca, 2% Mg, and the like. The layered phyllosilicate can comprise at least one of beidellite, ferrosaponite, hectorite, laponite, muscovite, montmorillonite (for example, sodium montmorillonite, magnesium montmorillonite, calcium montmorillonite, or protonated montmorillonite), nontronite, phlogopite, pimelite, saponite, sauconite, sobockite, stevensite, svinfordite, swinefordite, vermiculite, yakhontovite, volkonskoite zincsilite, synthetic clays, mixed layered illite/smectite minerals (for example, rectorite, tarosovite, or ledikite). The layered phyllosilicate can comprise a magnesium aluminum silicate. The layered phyllosilicate can comprise a zeolite.

The phyllosilicate can comprise an intercalated phyllosilicate in that the phyllosilicate includes an onium ion spacing agent. The onium ion spacing agent can comprise a protonated onium ion spacing agent that can be disposed between adjacent platelets of the layered phyllosilicate. The presence of the onium ion spacing agent can increase the interlayer spacing between the adjacent platelets by at least 3 Angstroms (Å), or at least 5 Å, to an interlayer spacing, for example, of at least 8 Å, or at least about 10 Å.

The phyllosilicate can be exfoliated, meaning that individual platelets of an intercalated layered phyllosilicate are present so that adjacent platelets of the intercalated layered phyllosilicate can be dispersed individually throughout a carrier material, for example, a polymer matrix. Exfoliation, as used herein, refers to a process for forming an exfoliated phyllosilicate from an intercalated phyllosilicate.

The silicate particles can comprise an aluminosilicate, for example, a zeolite. The aluminosilicate can have a silica-to-alumina ratio ($SiO_2$ to $Al_2O_3$) of 2 to 75. The aluminosilicate can comprise an alkaline earth metal, for example, at least one of Sr or Ba. A molar ratio of alkaline earth metal to alumina can be less than 0.1. The aluminosilicate zeolite can be free or substantially free of alkaline metal. The aluminosilicate can comprise at least one of a large pore zeolite having a framework with a maximum ring size of greater than 10 tetrahedral atoms, a medium pore zeolite having a framework having a maximum ring size of 8 to 10 tetrahedral atoms, or a small pore zeolite having a framework having a maximum ring size of less than 8 tetrahedral atoms.

The aluminosilicate can comprise at least one of a beta-type zeolite, ferrierite, MCM-22, mordenite, faujasite (Y zeolite), ZSM-5, ZSM-20, ZSM-22, ZSM-48, or ZSM-57.

An average lateral dimension of the silicate particles can be between 10-200 micrometers (µm) as determined in accordance with scanning electron microscopy (SEM) imaging. The silicate particles can comprise a plurality of platelets. Each platelet can have an average thickness of at least 1.5 nanometers (nm). Each of the plurality of the filler particles can have an aspect ratio of at least 1:100 (length:thickness).

The composition further comprises intercalating compounds located on a surface of the plurality of the particles (i.e., as a coating). The intercalating compound can be a polymeric intercalating compound or a charged small molecule. The polymeric intercalating compound can have a degree of polymerization sufficient to change the basal spacing of the filler particles relative to the basal spacing of the filler particles in the absence of the intercalating compound. As used herein, the term "polymeric intercalating compound" includes oligomeric compounds. For example, the polymeric intercalating compound can have a degree of polymerization at least 2, for example 2 to 100, or 2 to 50, or 2 to 25. In an aspect, the polymeric intercalating compound can have a degree of polymerization of 2 to 10. When the intercalating compound is a charged small molecule, the charged small molecule can have a molecular size sufficient to change the basal spacing of the filler particles relative to the basal spacing of the filler particles in the absence of the intercalating compound.

It will be understood that the charge of the intercalating compound can be selected depending on the charge of the ionic layered filler particles. For example, positively charged filler particles can be used with an anionic intercalating compound. Conversely, negatively charged filler particles can be used with a cationic intercalating compound.

In an aspect, the intercalating compounds can comprise a polyelectrolyte. In an aspect, the polyelectrolyte can comprise a polymer backbone having a plurality of tethered cations and a plurality of counter anions. For example, positively charged polyelectrolytes can include polyquaterniums, polyethylenimine, polylysine, quaternary ammonium grafted polyacrylic acid, chitosan, poly-L-arginine, cellulose derivatives, cationic peptides and polypeptides, and combinations thereof. Exemplary negative anionic counter ions can include chloride, bromide, iodide, sulfate, phosphate, acetate, citrate, nitrate, and combinations thereof.

In an aspect, the polyelectrolyte can comprise a polymer backbone having a plurality of tethered anions and a plurality of counter cations. For example, negatively charged polyelectrolytes can include polyacrylic acid, polysulfonic acid, poly(sodium styrene sulfonate), polyvinylsulfonate, alginic acid, carboxymethyl cellulose, hyaluronic acid, poly (acrylamide-co-acrylic acid), and combinations thereof. Exemplary positive counter ions can include sodium, potassium, calcium, magnesium, ammonium, hydrogen, iron, copper, zinc, aluminum, lithium, nickel, silver, and combinations thereof.

In a specific aspect, the intercalating compound can comprise an alkylated polypyridine. The alkylated polypyridine can have the formula (I)

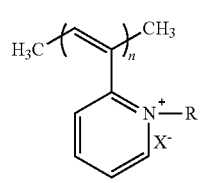

wherein each R independently is a $C_{8-24}$ alkyl group, n is 1 to 12, preferably 1 to less than 12, or 1 to 10, or 1 to 8. Each X is a negative counter ion, for example chloride, bromide, iodide, sulfate, phosphate, acetate, citrate, or nitrate The weight average molecular weight of the alkylated polypyridine can be determined by one of ordinary skill in the art. In an aspect, each R is independently a $C_{10-20}$ alkyl group, or a $C_{12-16}$ alkyl group. In an aspect, X is independently at each occurrence chloride, bromide, or iodide, preferably bromide. In a specific aspect, each R is independently a $C_{12-16}$ alkyl group and each X is bromide.

The alkylated polypyridine can be prepared by polymerizing a pyridine monomer in the presence of a halogenated alkane. The pyridine monomer can comprise 2-ethynylpyridine or various pyridine-modified compounds mentioned above, so long as the positively charged counter ion in the pyridinium ring is available as a stable counter ion to balance the negative charge on the surface of the layered phyllosilicate. Model compounds of pyridinium salts as starting materials for the spontaneous polymerization process leading to the development of the polyelectrolyte complex will be performed.

The halogenated alkane can comprise a halogenated $C_{8-24}$ compound, for example, a halogenated $C_{10-20}$ compound. The halogen can comprise at least one of chlorine, bromine, or fluorine. The halogenated $C_{8-24}$ compound can be linear or branched. The halogenated $C_{8-24}$ compound can contain one or more unsaturations. The halogenated $C_{8-24}$ compound can comprise one or more heteroatoms. The halogenated $C_{8-24}$ compound can comprise a halogenated hydrocarbon that can be free of heteroatoms other than the halogen. The halogenated alkane can comprise n-bromotetradecane In an aspect, the number of C atoms should h be low enough such that it doesn't hinder the spontaneous polymerization process or prevent displacement during reaction with phyllosilicate particles. Branching should be limited so that the spontaneous polymerization reaction is also not hindered. Unsaturations are permitted.

The alkylated polypyridine can be prepared by forming a mixture of the pyridine monomer and the halogenated alkane. The ethynyl group of the pyridine monomer will polymerize to form a polypyridine backbone and the halogenated alkane will react with the tertiary amine of the pyridine ring to form an attached ligand with an associated halogenated atom. A molar ratio of the pyridine monomer to the halogenated alkane in the mixture can be 2:1 to 1:2, or 1.1:1 to 1:1.1. The reacting of the pyridine monomer and the halogenated alkane can occur at a temperature of greater than or equal to 50 degrees Celsius (° C.), or 50 to 100° C., or 80 to 100° C. The reacting of the pyridine monomer and the halogenated alkane can occur for 0.5 to 10 days, or 2 to 6 days. The reacting of the pyridine monomer and the halogenated alkane can occur in an inert atmosphere, for example, comprising nitrogen or argon. After the polymerizing, the alkylated polypyridine can be purified, for example, by dissolving in a solvent such as tetrahydrofuran (THF) and precipitating in a non-solvent such as cyclohexane.

The intercalating compound (e.g., the alkylated polypyridine) can be coated on the silicate particles by mixing the silicate particles with the intercalating compound, optionally in the presence of a solvent such as methanol. The coating can be considered as a solution coating process that has the benefit of being a relatively easy procedure. In the present coating process, it is believed that the positive charge of the intercalating compound (e.g., the amine group of the polypyridine) interacts with the negative surface charge of the silicate particles and the counterion interacts with the counter ions of the silicate particles.

The coating process can occur at a temperature of greater than or equal to 30° C., or 40 to 100° C., or 55 to 65° C. The coating process can occur for 5 to 40 hours, or 15 to 30 hours. After the coating, the coated silicate particles can be washed, for example, with water followed by methanol to remove any of the unreacted intercalating compound (e.g., alkylated polypyridine), filtered, and dried, for example, at a temperature of 40 to 100° C., or 70 to 90° C., for a period of time, for example, 5 to 30 hours, or 8 to 24 hours. The coated silicate particles can be sonicated to reduce aggregation.

A weight ratio of the phyllosilicate and the intercalating compound (e.g., polyelectrolyte) can be greater than or equal to 1:100.

A composite can comprise the coated, silicate particles embedded in a matrix. The matrix can be a UV-curable matrix. In one embodiment of the composition, the matrix can comprise an epoxy matrix. It was surprisingly discovered that the curing of the epoxy resin is not affected by the presence of the ionic group of the intercalating compound (e.g., a cationic pyridine) or the basic nature of the silicate particles, as it was previously thought that one or both of these conditions would have impeded the curing of the epoxy. The composite can comprise 1 to 50 weight percent (wt %), or 5 to 15 wt % of the coated, silicate particles based on the total weight of the composite.

The epoxy matrix can be derived from a polymerizable composition comprising an epoxy monomer. The epoxy monomer can comprise at least one of 1,4-butanediol glycidyl ether, 1,2-epoxy-4-(epoxyethyl)cyclohexane, glycerol triglycidyl ether, diethylene glycol diglycidyl ether, 2,6-diglycidyl phenyl glycidyl ether, 1,1,3-tris[p-(2,3-epoxypropoxy)phenyl]propane, 1,2-cyclohexane dicarboxylic acid diglycidyl ester, 4,4'-methylenebis(N,N-diglycidylaniline), 3,4-epoxycyclohexylmethyl-3,4-epoxycyclohexane carboxylate, trimethylol ethane triglycidyl ether, triglycidyl-p-aminophenol, tetraglycidyl metaxylenediamine, tetraglycidyl diaminodiphenyl methane, tetraglycidyl-1,3-bisaminomethylcyclohexane, bisphenol-A-diglycidyl ether, bisphenol-S-diglycidyl ether, pentaerythritol tetraglycidyl ether, resorcinol diglycidyl ether, phthalic acid diglycidyl ester, neopentyl glycol diglycidyl ether, polypropylene glycol diglycidyl ether, tetrabromo bisphenol-A-diglycidyl ether, bisphenol hexafluoroacetone diglycidyl ether, pentaerythritol diglycidyl ether, tris-(2,3-epoxypropyl)isocyanurate, monoallyldiglycidyl isocyanurate, diglycerol polyglycidyl ether, pentaerythritol polyglycidyl ether, 1,4-bis(2,3-epoxypropoxyperfluoroisopropyl)cyclohexane, sorbitol polyglycidyl ether, trimethyrolpropane polyglycidyl ether, resorcin diglycidyl ether, 1,6-hexanediol diglycidyl ether, polyethylene glycol diglycidyl ether, phenyl glycidyl ether, p-tert-butylphenyl glycidyl ether, adipic acid diglycidyl ether, o-phthalic acid diglycidyl ether, dibromophenyl glycidyl ether, 1,2,7,8-diepoxyoctane, 1,6-dimethyrolperfluorohexane diglycidyl ether, 4,4'-bis(2,3-epoxypropoxyperfluoroisopropyl)diphenyl ether, 2,2-bis(4-glycidyloxyphenyl)propane, 3,4-epoxycyclohexylmethyl-3',4'-epoxycyclohexane carboxylate, 3,4-epoxycyclohexyl oxirane, 2-(3,4-epoxycyclohexyl)-3',4'-epoxy-1,3-dioxane-5-spirocyclohexane, 1,2-ethylenedioxy-bis(3,4-epoxycyclohexylmethane), 4',5'-epoxy-2'-methylcyclohexylmethyl-4,5-epoxy-2-methylcyclohexane carboxylate, ethylene glycolbis(3,4-epoxycyclohexanecarboxylate), bis-(3,4-epoxycyclohexylmethyl)adipate, or bis(2,3-epoxycyclopentyl)ether. The epoxy matrix can be derived from a polymerizable composition comprising 3,4-epoxycyclohexylmethyl-3',4'-epoxycyclohexane carboxylate.

The polymerizable composition can comprise an oxetane containing compound. The oxetane containing compound can comprise 1 to 6, or 2 to 4 oxetane rings. The oxetane containing compound can comprise at least one of 3-ethyl-3-hydroxymethyl oxetane, 3-ethyl-3-(phenoxymethyl)oxetane, 3,3-diethyl oxetane, and 3-ethyl-(2-ethylhexyloxymethyl)oxetane, 1,4-bis(((3-ethyl-3-oxetanyl)methoxy)methyl)benzene, di((3-ethyl-3-oxetanyl)methyl)ether, or pentaerythritol tetrakis((3-ethyl-3-oxetanyl)methyl)ether. The oxetane containing compound can comprise at least one of 3-ethyl-3-hydroxymethyl oxetane. Preferred compositions comprise of epoxide and oxetane functionalities wherein the ratio of the epoxide to oxetane functionalities is at least 1:4 and preferably 3:2.

The polymerizable composition can comprise a polyol compound having 2 to 6 hydroxy groups, for example, at least one of ethylene glycol, triethylene glycol, tetraethylene glycol, tris(2-hydroxyethyl)isocyanuric acid, triethanol amine or pentaerythritol.

The polymerizable composition can comprise a photoinitiator. The photoinitiator can comprise a compound that generate an acid, a base, a radical, or a cation. For example, the photoinitiator can comprise a compound that can generate an active radical by light irradiation and cause radical polymerization of the polymerizable composition or a compound that can generate a cation species such as a protonic acid and a carbon cation, etc. by light irradiation and cause cation polymerization of the polymerizable composition. The light irradiation can be performed by use of light having a wavelength of 150 to 1000 nanometers (nm), or 193 nm to 700 nm, or 300 nm to 600 nm.

The photoinitiator can comprise at least one of an imidazole compound, a diazo compound, a bisimidazole compound, an N-arylglycine compound, an organic azide compound, a titanocene compound, an aluminate compound, an organic peroxide, an N-alkoxypyridinium salt compound, or a thioxanthone compound. The photoinitiator can comprise an aromatic iodonium salt compound, an aromatic sulfonium salt compound, an aromatic diazonium salt compound, an aromatic phosphonium salt compound, a triazine compound, or an iron arene complex compound. The aromatic iodonium salt compound can comprise at least one of diphenyliodonium hexafluorophosphate, diphenyliodonium trifluoromethane sulfonate, diphenyliodonium nanofluoron-butane sulfonate, diphenyliodonium perfluoro-n-octane sultanate, diphenyliodonium camphor sulfonate, bis(4-tert-butylphenyl)iodonium camphor sulfonate, or bis(4-tert-butylphenyl)iodonium trifluoromethane sulfonate. The aromatic sulfonium salt compound can comprise at least one of triphenylsulfonium hexafluoroantimonate, triphenylsulfonium nonafluoron-butanesulfonate, triphenylsulfonium camphor sulfonate, or triphenylsulfonium trifluoromethane sulfonate.

The polymerizable composition can comprise at least one of an accelerator or a photosensitizer that can increase the sensitivity of the photoinitiator to light. The catalytically active accelerator can comprise a Lewis acid. The photosensitizer can comprise at least one of a pyrromethene complex compound, a xanthene type coloring compound, or a ketothiazorine compound. The photosensitizer can comprise at least one of 2,4-diphenyl-6-(p-dimethylaminostyryl)-1,3,5-triazine, 2,4-diphenyl-6-(([2,3,6,7]tetrahydro-1H,5H-benzo[ij]quinolidine-9-yl)-1-ethene-2-yl)-1,3,5-triazonenanthryl-(([2,3,6,7]tetrahydro-1H,5H-benzo[ij]quinolidine-9-yl)-1-ethene-2-yl)ketone, or 2,5-bis(p-dimethylaminocinnamylidene)cyclopentanone, 5,10,15,20-tetraphenylporphyrin.

The composite can have a water vapor transmission rate (WVTR) of less than 0.5 grams per meter squared per day per 100 micrometers ($g/m^2 \times day \times 100$ micrometers) tested in using a water vapor transmission tester equipped with a coulometric sensor such as the MOCON™ Aquatran III. For WVTR testing, the films are enclosed in a permeation chamber at 37.8° C. and 50% relative humidity (RH) with data recorded at two-hour intervals for five days or until a steady-state value of +5% over 6 hours is obtained.

The composite can have an oxygen transmission rate (OTR) of less than or equal to 0.01 cubic centimeters per meter squared per day per 100 micrometers (($cc/m^2$)/day/100 μm) measured using an oxygen analyzer equipped with a coulometric oxygen sensor such as Systech Illinois Oxygen Permeation Analyzer 8001. For OTR testing, the films are enclosed in a permeation chamber at 37.8° C. and 0% RH with data recorded at one-hour intervals for three days or until a steady-state value of ±5% over 3 hours was obtained.

The composite can have an optical transmission in the UV and visible region between 520 to 720 nm of greater than or equal to 85%, or greater than or equal to 90% as determined using a UV-Vis Spectrophotometer equipped with both Tungsten-Halogen and Deuterium lamps such as the Perkin Elmer Lambda 9 UV-Vis Spectrophotometer. A spectral bandwidth of 2 nanometers and a scan rate of 60 nanometers per minute are used.

An article can comprise the composite. The composite can be in the form of a layer in a multilayer. The article can be an electronic device, for example, solid-state organic photovoltaic fibers consisting of at least one working electrode in ohmic contact with at least one counter electrode, physically encapsulated within the composite.

The following examples are provided to illustrate the present disclosure. The examples are merely illustrative and are not intended to limit devices made in accordance with the disclosure to the materials, conditions, or process parameters set forth therein.

EXAMPLES

In the examples, ATR-FTIR spectroscopy was performed at 4000 cm-1 to 400 cm-1 at a resolution of 4 cm-1 using a ThermoFisher Scientific Nicolet iS50 FTIR spectrometer to characterize the structure and major functional groups, while a PERKIN ELMER™ Lambda 9 UV-Vis-NIR spectrophotometer was used to characterize the optical properties of the resultant compound to reveal the nature of conjugation on each structural unit.

Water vapor transmission rate (WVTR) testing was performed using a MOCON™ Aquatran III water vapor transmission tester equipped with a coulometric sensor. For WVTR testing, the films were enclosed in a permeation chamber at 37.8° C. and 50% relative humidity (RH) with data recorded at two-hour intervals for five days or until a steady-state value of ±5% over 6 hours was obtained.

Oxygen transmission rate (OTR) testing was performed using a SYSTECH ILLINOIS™ Oxygen Permeation Analyzer 8001 equipped with a coulometric oxygen sensor. For OTR testing, the films were enclosed in a permeation chamber at 37.8° C. and 0% RH with data recorded at one-hour intervals for three days or until a steady-state value of +5% over 3 hours was obtained.

Optical transmission in the UV and visible region between 300 to 750 nm was determined using the PERKIN ELMER™ Lambda 9 UV-Vis Spectrophotometer equipped with both Tungsten-Halogen and Deuterium lamps. A spectral bandwidth of 2 nanometers and a scan rate of 60 nanometers per minute were used.

In the examples, the following compounds were used.

dissolution in tetrahydrofuran (THF) and precipitation in cyclohexane. The PEPy-C14 oligomer was centrifuged and dried at 80° C. overnight.

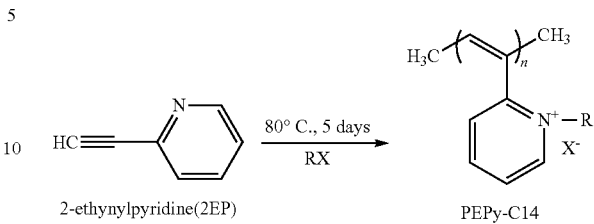

Figure 2:
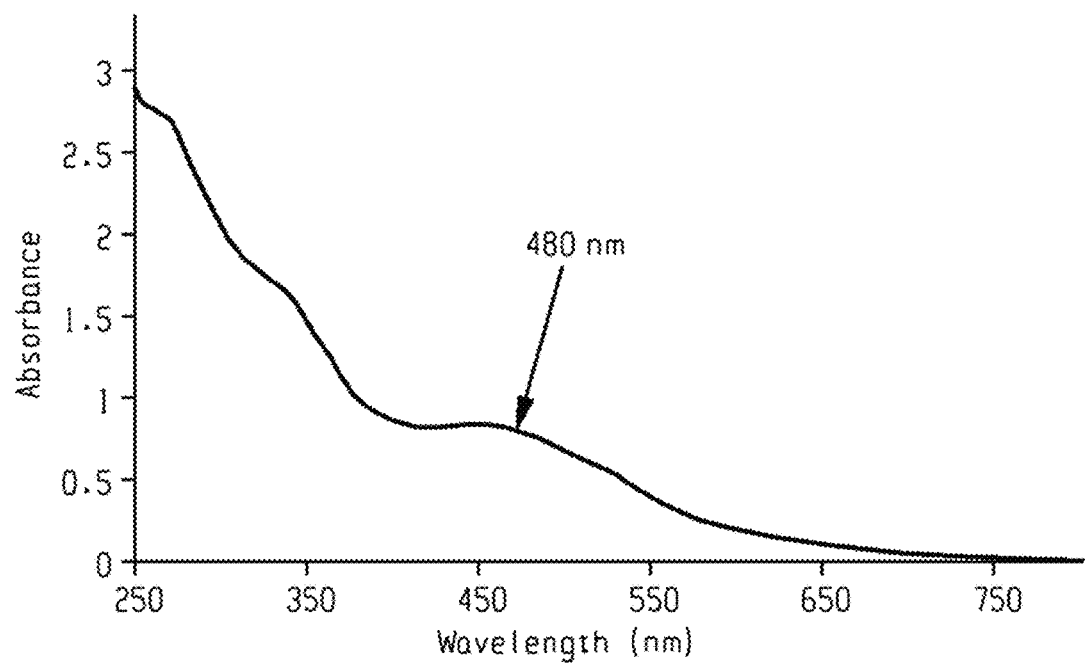
FIG. 2 is a graphical illustration of the UV-Vis absorption spectra of Example 1.

FTIR and UV-Vis absorption spectra of the PEPy-C14 oligomer were taken and shown in FIG. 1 and FIG. 2, respectively. In the ATR-FTIR spectrum of FIG. 1, the strong absorption bands arising from $CH_2$ asymmetric (2925 cm-1) and symmetric (2854 cm-1) stretching modes of the alkyl chains are indicative of highly ordered tetradecyl chains within the layers. The band at 1466 cm-1 is due to the CH2 scissoring mode and is indicative of an orthorhombic subcell packing of alkyl chains. Additionally, the strong band at 1625 cm-1, is indicative of high conjugation within

TABLE 1

| Abbreviation | Description | Formula |
|---|---|---|
| 2EP | 2-ethynylpyridine | |
| BTD | n-bromo-tetradecane | |
| ECC epoxy | 3,4-epoxycyclohexylmethyl-3',4'-epoxycyclohexane carboxylate; CAS Number 2386-87-0 | |
| EH oxetane | 3-ethyl-3-hydroxymethyl oxetane (EHO) CAS Number 3047-32-3 | |
| Mica | Suzorite ® 150-S phlogopite mica | |

Example 1: Synthesis of Poly (N-tetradecyl-2-ethynylpyridinium bromide) (PEPy-$C_{14}$)

PEPy-C14 was synthesized using spontaneous polymerization of 2-ethynylpyridine (2EP) in the presence of n-bromotetradecane (BTD) following the process outlined in Zhou, P. and A. Blumstein. "Conjugated ionic polyacetylenes: 8. Amphiphilic poly(N-octadecyl-2-ethynylpyridinium bromide)." *Polymer* 37 (1996): 1477-1485 to form the PEPy-$C_{14}$ polymer shown below. The polymerization involved first forming a mixture comprising, equivalent molar ratios of 2EP and BTD and mixing at 80° C. for 5 days in a nitrogen enriched atmosphere. The resultant oligomer revealed a lustrous black solid which was further purified by the oligomer. The development of an absorption peak around 480 nm with a long absorption tail until 650 nm was observed in the UV-Vis absorption spectrum.

Example 2: Synthesis of Exfoliated Phlogopite Mica (E-Mica)

Natural phlogopite ground mica was subjected to thermal treatment under air at 600° C. for 1 hour to remove and residual contamination. Consequently, 3 grams of the heated treated ground mica were subjected to acid treatment using 100 milliliters mL of 5 molar HNO3 for 5 hours at a temperature of 95° C. The resultant dispersion was washed with water until a neutral pH was obtained, filtered and dried at 80° C. overnight.

The dried product was dissolved in aqueous NaCl at 95° C. for 4 hours to further increase the cation exchange capacity (CEC) by replacing the interlayer cations with Na+ (due to its low hydration radius). The resultant dispersion was washed with water until all the unreacted NaCl and residual Cl— was removed, filtered, and dried at 80° C. overnight. AgNO3 was used to confirm the complete removal of Cl— from the filtrate.

The sodium exchanged product was then mixed with a solution of the PEPy-C14 oligomer in methanol at 60° C. for 24 hours. The PEPy-C14 treated mica was then washed with water followed by methanol to remove any unreacted PEPy-C14 oligomer, filtered, and dried at 80° C. overnight.

The PEPy-C14 treated mica was then dispersed in water, subjected to sonication and left to stand overnight such that the aggregated particles were separated from the supernatant containing PEPy-C14 intercalated mica. The exfoliated mica in the supernatant was used for preparation of the encapsulant.

Figure 3:
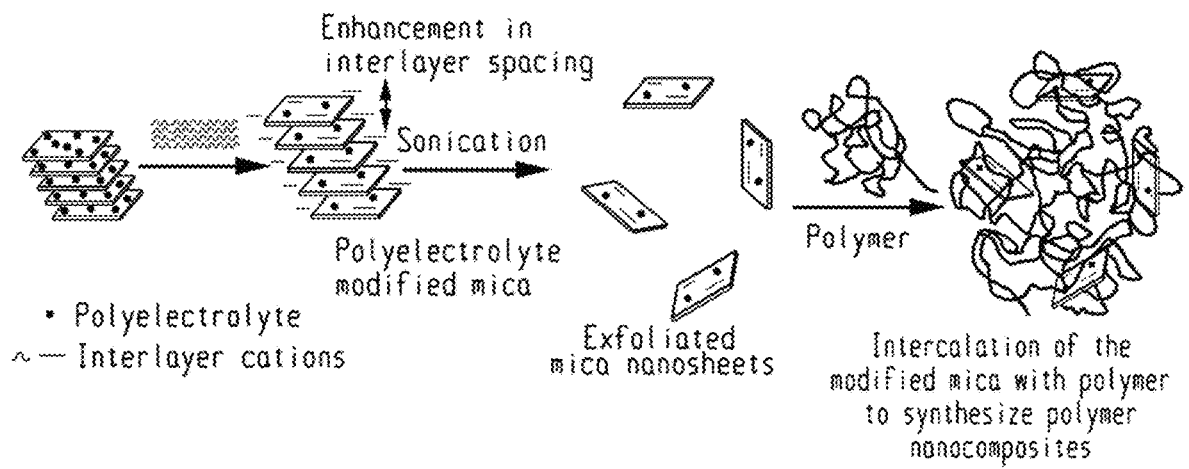
FIG. 3 is an illustration of the synthesis of the encapsulation of Examples 1-5.

Examples 3-5: Sheet Formation of Epoxy-Oxetane Modified With PEPy-$C_{14}$ Treated Mica An amount of PEPy-C14 mica (10% wt.) was dispersed in a mixture comprising the ECC epoxy (50.1% wt.), the EH oxetane (33.4% wt.), bis(4-dodecylphenyl) iodonium hexafluoroantimonate (2% wt.), 2-chlorothioxanthen-9-one (1% wt.), boron trifluoride tetrahydrofuran (0.5% wt.), and polycaprolactone triol (3% wt.) and was subjected to probe sonication at an amplitude between 1 to 5 Watts for 10 to 60 minutes with 10 second intervals. This was used to further exfoliate and disperse any large aggregates, intercalated with PEPy-C14. Subsequently, the formulation was subjected to shear mixing using a Flacktek speed mixer. The mixed solution was cast onto a PET substrate using a doctor blade on a coating system (MTI corporation) and cured using a mercury-vapor lamp with a power irradiance of 10 mW/cm² and a spectral output between 320 to 500 nanometers to form 100 micrometer thick films. An overview of the formation of the composites, illustrating Examples 1-5 is illustrated in FIG. 3.

The cured films along with the PET substrate were sandwiched between two aluminum foils with a 5 centimeter squared (cm²) opening for the transmission of water and/or permeation of oxygen respectively. The results, as shown in Table 2, clearly shows the significant reduction in both the water and oxygen transmission through the film of Example 5 that includes the PEPy-C14 treated mica.

TABLE 2

| Example | 3 | 4 | 5 |
|---|---|---|---|
| Epoxy-oxetane resin (wt %) | 100 | 90 | 90 |
| Untreated mica (wt %) | — | 10 | — |
| PEPy-$C_{14}$ treated mica (wt %) | — | — | 10 |
| Properties | | | |
| WVTR (g/m² × day × 100 micrometers) | 1.02 | 0.811 | 0.105 |
| OTR (cc/m² × day × 100 micrometers) | 3.88 | 0.016 | <0.008 |
| Normalized enthalpy during the 30 s cure (J/g) | 860 | 881 | 876 |

Differential Scanning Photocalorimetry (DPC) was performed to evaluate the curing kinetics of the epoxy-oxetane resin, where 3 to 3.5 milligrams of three different encapsulant formulations were loaded to an aluminum pan and irradiated by ultraviolet (UV) light from a mercury-vapor lamp under a dry air atmosphere for a period of 30 seconds followed by an isothermal hold period of 2 minutes. The light intensity was adjusted to 1 Watt per centimeter squared (W/cm²), and the light wavelength used was 320 to 500 nanometers. The results are shown in Table 2, where s stands for seconds and J/g stands for Joules per gram. Table 2 shows that the normalized exothermic energy indicative of the extent of cure exhibited by the three encapsulant system is significantly higher than traditional cationic UV curing systems without oxetane-based reactive diluents. From the normalized enthalpy during the 30-second cure period, it was observed that the addition of the concoction of untreated and modified phyllosilicate fillers did not significantly affect the curing behavior from the original formulation. This rapid-curing behavior allows the thin films to serve a viable encapsulant and maintain ohmic contact between one or more fiber(s) in fiber-based electronic device.

Figure 4:
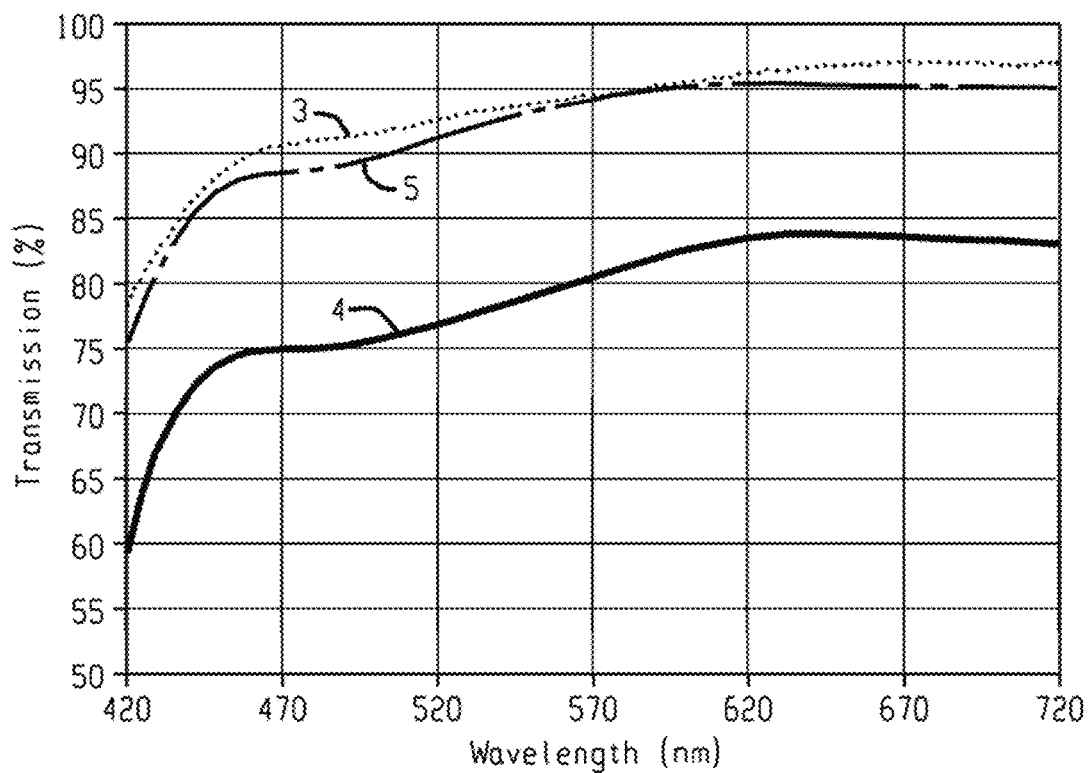
FIG. 4 is a graphical illustration of the optical transmission spectra of Examples 3-5.

The films of Examples 3-5 were then evaluated for optical transmission and the results are shown in FIG. 4. FIG. 4 shows the optical transmission spectra of the cured encapsulant specimens from 420 to 720 nm. FIG. 4 illustrates that the change in optical transmittance is reduced drastically on incorporating the unexfoliated ground mica compared to the original formulation. The presence of large aggregates scatters incoming light and is thus not suitable to function as an encapsulant in applications requiring optical transparency. Example 5 comprising of the exfoliated mica sheets with polyelectrolyte modification showed an optical transmittance comparable to that of the original formulation. Modification of the ground mica fillers using PEPy-C14 and subsequent exfoliation within the encapsulant matrix significantly reduced the aggregate size yielding less scattering of the incoming light. The high optical transparency coupled with its enhanced barrier properties makes the formulation a viable candidate for electronic devices of various form-factors.

Set forth below are non-limiting aspects of the present disclosure.

Aspect 1: A composition comprising: a plurality of ionic layered filler particles; wherein each of the plurality of ionic layered filler particles has an aspect ratio of at least 1:100; wherein the plurality of ionic layered filler particles is coated with an intercalating compound on a surface of the plurality of the ionic layered filler particles; wherein the intercalating compound has a size sufficient to change the basal spacing of the ionic layered filler particles relative to the basal spacing of the ionic layered filler particles in the absence of the intercalating compound, wherein the intercalating compound comprises a polyelectrolyte or a charged small molecule.

Aspect 2: The composition of aspect 1, wherein the ionic layered filler particles comprise a multi-layered phyllosilicate, a multi-layered aluminosilicate, or a combination thereof.

Aspect 3: The composition of aspect 1 or 2, wherein the polyelectrolyte comprises a cationic polyelectrolyte and a plurality of negatively charged counter ions.

Aspect 4: The composition of any of aspects 1 to 3, wherein the intercalating compound comprises an alkylated polypyridine having a formula (I)

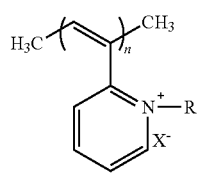

(I)

wherein each R independently is a $C_{8-24}$ alkyl group, n is an integer from 1 to 12, and each X is independently chloride, bromide, iodide, sulfate, phosphate, acetate, citrate, or nitrate.

Aspect 5: The composition of aspect 4, wherein each R is independently a $C_{10-20}$ alkyl group and each X is independently chloride, bromide, or iodide.

Aspect 6: The composition of aspect 4, wherein each R is independently a $C_{12-16}$ alkyl group and each X is bromide.

Aspect 7: The composition of any of aspects 1 to 6, wherein a weight ratio of the ionic layered filler particles and the intercalating compound is greater than or equal to at least one time the cation exchange capacity or anion exchange capacity of the ionic layered filler particle.

Aspect 8: A composite comprising: the composition of any of aspects 1 to 7, and a matrix; wherein the composition is embedded in the matrix.

Aspect 9: The composite of aspect 8, wherein the matrix comprises of a resin selected from acrylate, epoxy, urethane, silicone, oxetane or combinations thereof.

Aspect 10: The composite of aspect 8 or 9, wherein the matrix comprises an epoxy.

Aspect 11: The composite of any of aspects 8 to 10, wherein the matrix comprises a combination of an epoxy and an oxetane.

Aspect 12: The composite of aspect 11, wherein the matrix is derived from an epoxy monomer or oligomer and an oxetane monomer or oligomer.

Aspect 13: The composite of aspect 12, wherein the epoxy monomer comprises a linear, branched or cyclic monomer or oligomer.

Aspect 14: The composite of aspect 12 or 13, wherein the epoxy monomer comprises of an epoxycyclohexylmethyl-3',4'-epoxycyclohexane carboxylate.

Aspect 15: The composite of any of aspects 12 to 14, wherein the oxetane monomer comprises 3-ethyl-3-hydroxymethyl oxetane.

Aspect 16: The composite of any of aspects 8 to 15, wherein the composite has an optical transparency greater than 85% in the visible region as determined in the visible region between 520 to 720 nm using a UV-Vis Spectrophotometer equipped with both Tungsten-Halogen and Deuterium lamps using a spectral bandwidth of 2 nanometers and a scan rate of 60 nanometers per minute; or an oxygen transmission rate (OTR) of less than or equal to 0.01 cubic centimeters per meter squared per day per 100 micrometers ((cc/m²)/day/100 micrometers) measured using an oxygen permeation analyzer equipped with a coulometric oxygen sensor; or a water vapor transmission rate (WVTR) of less than 0.5 grams per meter squared per day per 100 micrometers ((g/m²)/day/100 micrometers) measured using a water vapor transmission tester equipped with a coulometric sensor.

Aspect 17: A curable composition comprising: the composition of any of aspects 1 to 7; a crosslinkable monomer comprising a resin selected from the group consisting of acrylate, epoxy, urethane, silicone, oxetane or combinations thereof; a photoinitiator; a photosensitizer; and a catalytically active accelerator comprising a Lewis acid.

Aspect 18: The curable composition of aspect 17, further comprising an oxetane containing compound and a polyol compound having 2 to 6 hydroxy groups.

Aspect 19: The curable composition of aspect 17 or 18, further comprising a curing agent that is capable of inducing cross-linking within the matrix.

Aspect 20: The curable composition of aspect 19, wherein the curing agent comprises a thermal-curing agent, a moisture-curing agent, a photo-curing agent, or a combination thereof.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears. Unless defined otherwise, technical and scientific terms used herein have the same meaning as is commonly understood by one of skill in the art to which this disclosure belongs.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A composition comprising:
a plurality of ionic layered filler particles;
wherein each of the plurality of ionic layered filler particles has an aspect ratio of at least 1:100;
wherein the plurality of ionic layered filler particles is coated with an intercalating compound on a surface of the plurality of the ionic layered filler particles;
wherein the intercalating compound has a size sufficient to change the basal spacing of the ionic layered filler particles relative to the basal spacing of the ionic layered filler particles in the absence of the intercalating compound,
wherein the intercalating compound comprises an alkylated polypyridine having a formula (I)

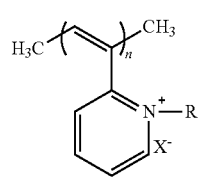

wherein
each R independently is a C8-24 alkyl group,
n is an integer from 1 to 12, and
each X is independently chloride, bromide, iodide, sulfate, phosphate, acetate, citrate, or nitrate.

2. The composition of claim 1, wherein the ionic layered filler particles comprise a multi-layered phyllosilicate, a multi-layered aluminosilicate, or a combination thereof.

3. The composition of claim 1, wherein the polyelectrolyte comprises a cationic polyelectrolyte and a plurality of negatively charged counter ions.

4. The composition of claim 1, wherein each R is independently a $C_{10-20}$ alkyl group and each X is independently chloride, bromide, or iodide.

5. The composition of claim 1, wherein each R is independently a $C_{12-16}$ alkyl group and each X is bromide.

6. The composition of claim 1, wherein a weight ratio of the ionic layered filler particles to the intercalating compound is greater than or equal to at least one time the cation exchange capacity or anion exchange capacity of the ionic layered filler particle.

7. A composite comprising:
the composition of claim 1, and
a matrix;
wherein the composition is embedded in the matrix.

8. The composite of claim 7, wherein the matrix comprises of a resin selected from acrylate, epoxy, urethane, silicone, oxetane or combinations thereof.

9. The composite of claim 7, wherein the matrix comprises an epoxy.

10. The composite of claim 7, wherein the matrix comprises a combination of an epoxy and an oxetane.

11. The composite of claim 10, wherein the matrix is derived from an epoxy monomer or oligomer and an oxetane monomer or oligomer.

12. The composite of claim 11, wherein the epoxy monomer comprises a linear, branched or cyclic monomer or oligomer.

13. The composite of claim 11, wherein the epoxy monomer comprises of a epoxycyclohexylmethyl-3',4'-epoxycyclohexane carboxylate.

14. The composite of claim 11, wherein the oxetane monomer comprises 3-ethyl-3-hydroxymethyl oxetane.

15. The composite of claim 7, wherein the composite has an optical transparency greater than 85% in the visible region as determined in the visible region between 520 to 720 nm using a UV-Vis Spectrophotometer equipped with both Tungsten-Halogen and Deuterium lamps using a spectral bandwidth of 2 nanometers and a scan rate of 60 nanometers per minute; or
an oxygen transmission rate (OTR) of less than or equal to 0.01 cubic centimeters per meter squared per day per 100 micrometers ((cc/m$^2$)/day/100 micrometers) measured using an oxygen permeation analyzer equipped with a coulometric oxygen sensor; or
a water vapor transmission rate (WVTR) of less than 0.5 grams per meter squared per day per 100 micrometers ((g/m$^2$)/day/100 micrometers) measured using a water vapor transmission tester equipped with a coulometric sensor.

16. A curable composition comprising:
a composition comprising
a plurality of tonic layered filler particles;
wherein each of the plurality of ionic layered filler particles has an aspect ratio of at least 1:100;
wherein the plurality of ionic layered filler particles is coated with an intercalating compound on a surface of the plurality of the ionic layered filler particles;
wherein the intercalating compound has a size sufficient to change the basal spacing of the ionic layered filler particles relative to the basal spacing of the ionic layered filler particles in the absence of the intercalating compound,
wherein the intercalating compound comprises a polyelectrolyte or a charged small molecule;
a crosslinkable monomer comprising a resin selected from the group consisting of acrylate, epoxy, urethane, silicone, oxetane or combinations thereof;
a photoinitiator;
a photosensitizer; and
a catalytically active accelerator comprising a Lewis acid.

17. The curable composition of claim 16, further comprising an oxetane containing compound and a polyol compound having 2 to 6 hydroxy groups.

18. The curable composition of claim 16, further comprising a curing agent that is capable of inducing crosslinking within the matrix.

19. The curable composition of claim 18, wherein the curing agent comprises a thermal-curing agent, a moisture-curing agent, a photo-curing agent, or a combination thereof.

* * * * *